US010652264B2

(12) United States Patent
Steele (10) Patent No.: US 10,652,264 B2
(45) Date of Patent: May 12, 2020

(54) INFORMATION SECURITY VULNERABILITY ASSESSMENT SYSTEM

(71) Applicant: BANK OF AMERICA CORPORATION, Charlotte, NC (US)

(72) Inventor: David Michael Steele, Carrollton, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 203 days.

(21) Appl. No.: 15/826,979

(22) Filed: Nov. 30, 2017

(65) Prior Publication Data

US 2019/0166153 A1 May 30, 2019

(51) Int. Cl.
*H04L 29/06* (2006.01)
*G06F 21/62* (2013.01)
*G06N 20/00* (2019.01)
*G06F 21/57* (2013.01)

(52) U.S. Cl.
CPC ........ *H04L 63/1433* (2013.01); *G06F 21/577* (2013.01); *G06F 21/6245* (2013.01); *G06N 20/00* (2019.01); *H04L 63/08* (2013.01); *H04L 63/1408* (2013.01); *H04L 63/1441* (2013.01)

(58) Field of Classification Search
CPC ........... H04L 63/14–1491; H04L 63/10; H04L 63/08; G06F 21/50–577
See application file for complete search history.

(56) References Cited

U.S. PATENT DOCUMENTS

| | | |
|---|---|---|
| 6,418,436 B1 | 7/2002 | Degen et al. |
| 6,516,056 B1 | 2/2003 | Justice et al. |
| 7,480,631 B1 | 1/2009 | Merced et al. |
| 7,873,732 B2 | 1/2011 | Chen et al. |
| 8,370,936 B2 | 2/2013 | Zuk et al. |
| 8,458,069 B2 | 6/2013 | Adjaoute |
| 8,606,712 B2 | 12/2013 | Choudhuri et al. |
| 8,635,695 B2 | 1/2014 | Zuk et al. |
| 8,666,841 B1 | 3/2014 | Claridge et al. |
| 8,676,684 B2 | 3/2014 | Newman et al. |
| 8,776,180 B2 | 7/2014 | Kumar et al. |
| 8,903,859 B2 | 12/2014 | Zeppenfeld et al. |
| 9,027,125 B2 | 5/2015 | Kumar et al. |
| 9,118,702 B2 | 8/2015 | MaCaulay |
| 9,438,615 B2 | 9/2016 | Gladstone et al. |

(Continued)

*Primary Examiner* — Meng Li
*Assistant Examiner* — Shaqueal D Wade
(74) *Attorney, Agent, or Firm* — Michael A. Springs; Moore & Van Allen PLLC; Nicholas C. Russell (57) ABSTRACT

Embodiments of the invention are directed to systems, methods, and computer program products for real-time generation and deployment of specific user information security vulnerability levels based on vulnerability assessments for the user. The invention utilizes a two-component system to detect security vulnerabilities for a user, generate a coherent vulnerability level for the user in real-time, and provides user specific mitigation actions depending on each user vulnerability assessment. The first component of the system is an information threat assessment engine, which identifies and/or receives external and internal data regarding users to determine information security threats. The second component is an analytics engine, which is configured to generate vulnerability levels and specific mitigation actions for the user based on threat patterning.

17 Claims, 5 Drawing Sheets

(56) References Cited

U.S. PATENT DOCUMENTS

| | | |
|---|---|---|
| 9,680,861 B2 | 6/2017 | Ward et al. |
| 9,722,895 B1 | 8/2017 | Sarukkai et al. |
| 2008/0222706 A1* | 9/2008 | Renaud ............... H04L 63/1408 726/4 |
| 2009/0024663 A1* | 1/2009 | McGovern ............ G06F 21/577 |
| 2013/0104236 A1 | 4/2013 | Ray et al. |
| 2014/0201836 A1 | 7/2014 | Amsler |
| 2015/0073876 A1 | 3/2015 | Pieper et al. |
| 2015/0242619 A1 | 8/2015 | Bender et al. |
| 2016/0080399 A1 | 3/2016 | Harris et al. |
| 2016/0173509 A1 | 6/2016 | Ray et al. |
| 2016/0373419 A1 | 12/2016 | Weigold et al. |
| 2017/0061129 A1* | 3/2017 | Bektchiev ................ H04L 9/00 |
| 2017/0244740 A1 | 8/2017 | Mahabir et al. |
| 2017/0251013 A1 | 8/2017 | Kirti et al. |
| 2017/0324768 A1 | 11/2017 | Crabtree et al. |
| 2017/0346846 A1 | 11/2017 | Findlay |
| 2018/0034856 A1* | 2/2018 | Mallya ............... H04L 63/1408 |

\* cited by examiner

INFORMATION SECURITY VULNERABILITY ASSESSMENT SYSTEM

BACKGROUND

In the information security context, individuals and entities may commonly rely on third party systems and applications to run its various processes. As a result, security issues and vulnerabilities which could compromises within the third party systems and applications may in turn create a security threat to the user or entity. Accordingly, there is a need for a way to efficiently and effectively monitor user vulnerabilities.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The invention utilizes a two-component system to detect security vulnerabilities for a user and generate a vulnerability assessment for each individual user. Furthermore, the invention provides user specific mitigation actions depending on each user vulnerability assessment. The first component of the system is an information threat assessment engine, which identifies and/or receives external and internal data regarding users and third parties associated with the users in order to determine information security threats posed to the users by third-parties (e.g., the third party itself, the processes is provides, the applications provided by the third-parties to the entity, or the systems provided by the third-parties to the entity). Based on the external and internal data, the threat assessment engine may determine security threats, security threat information, and/or a security threat level based on the security threats and security threat information. In this way, the system may calculate a vulnerability assessment for each individual user based on the internal and external data.

The second component of the system is an analytics engine, which may comprise a machine learning component which is configured to detect threat patterns and anomalies in order to generate specific mitigation actions for the user.

As such, the invention generates a user specific vulnerability assessment for each user that will fluctuate based on information security threats posed to the user. The system may be associated with a financial institution having vulnerability data available. This internal data is then tied with external data, such as dark web data, third party data, or the like. Combining these internal and external data and utilizing the information threat assessment engine, the system may determine a vulnerability assessment for the user, which gives the user a view of their vulnerabilities to exposure. The system may then generate user specific mitigation actions for exposure or vulnerability mitigation that may include actions, education, or the like around the vulnerabilities. In this way, the system may provide a novel service offering for users for vulnerability assessment and mitigation actions based on the same.

The system leverages existing data to give users a vulnerability assessment or rating based on external dark web data (SSN, email, birth date, and other personal data on the Internet), credit card misappropriation trends (from financial institution systems), and the like. The system could also leverage/source existing external privacy services such as dark web search (using email addresses or the like), or other similar services to aggregate the appropriate external data in real time. The point of the invention is to collect both internal and external data elements to give users a view of their exposure via the vulnerability assessment. The system has valuable internal misappropriation data about users that can be layered for enhancing misappropriation assessments of the user. After providing users with a view of their potential vulnerably, the system gives tools and tips to help the users avoid future misappropriation or vulnerabilities. This would be seen by the users as a proactive awareness play to help protect themselves from misappropriation.

Embodiments of the invention relate to systems, methods, and computer program products for user specific information security vulnerability level generation, the invention comprising receiving authentication from a user for a user specific vulnerability assessment; identifying external data for the user, wherein the external data comprises security threat data for the user from an external data source, and wherein the external data is received from an external data source system; identifying internal data for the user, wherein the internal data comprises security threat data for the user from an internal data source; determining the user specific vulnerability assessment comprising information security threats for the user based on the external data and the internal data; calculating a vulnerability level for the user based on the information security threats; and presenting, via secured interface, a real-time vulnerability level for the user upon user authentication into the secured interface.

In some embodiments, the invention further comprises determining mitigation actions based on the one or more security threats, wherein the mitigation actions comprises steps for user action to positively adjust the vulnerability level for the user comprising security controls for implementation by user to mitigate the one or more security threats.

In some embodiments, calculating the vulnerability level for the user further comprises generating a level from a vulnerability continuum based on the number of vulnerabilities identified from the user specific vulnerability assessment.

In some embodiments, the internal data comprises: internal product data, wherein the product data is associated with products of the user; and incident data related to the user, wherein the incident data comprises resource account management incidents associated with the user.

In some embodiments, the information security threats for the user comprises one or more vulnerabilities for the user based on the external data and the internal data, wherein the vulnerabilities include at least unauthorized private information dissemination.

In some embodiments, identifying external data for the user, wherein the external data comprises security threat data for the user from an external data source, wherein the external data source is Internet traffic.

In some embodiments, the invention further comprises distribution of the user specific vulnerability level to one or more third parties for third party program user applications.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" may be a financial institution or third party merchant. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by the entity. In other embodiments, an entity may not be a financial institution. In still other embodiments, the entity may be the merchant itself.

A "transaction" or "resource distribution" refers to any communication between a user and the financial institution or other entity monitoring the user's activities to transfer funds for the purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. In some embodiments, the invention may authorize or allow a user access to one or more websites, physical locations, secure locations, accounts, interfaces, or the like.

The invention utilizes a two-component system to detect security vulnerabilities for a user and generate a vulnerability assessment for each individual user. Furthermore, the invention provides user specific mitigation actions depending on each user vulnerability assessment. The first component of the system is an information threat assessment engine, which identifies and/or receives external and internal data regarding users and third parties associated with the users in order to determine information security threats posed to the users by third-parties (e.g., the third party itself, the processes is provides, the applications provided by the third-parties to the entity, or the systems provided by the third-parties to the entity). Based on the external and internal data, the threat assessment engine may determine security threats, security threat information, and/or a security threat level based on the security threats and security threat information. In this way, the system may calculate a vulnerability assessment for each individual user based on the internal and external data.

The second component of the system is an analytics engine, which may comprise a machine learning component which is configured to detect threat patterns and anomalies in order to generate specific mitigation actions for the user.

As such, the invention generates a user specific vulnerability assessment for each user that will fluctuate based on information security threats posed to the user. The system may be associated with a financial institution having vulnerability data available. This internal data is then tied with external data, such as dark web data, third party data, or the like. Combining these internal and external data and utilizing the information threat assessment engine, the system may determine a vulnerability assessment for the user, which gives the user a view of their vulnerabilities to exposure. The system may then generate user specific mitigation actions for exposure or vulnerability mitigation that may include actions, education, or the like around the vulnerabilities. In this way, the system may provide a novel service offering for users for vulnerability assessment and mitigation actions based on the same.

The system leverages existing data to give users a vulnerability assessment or rating based on external dark web data (SSN, email, birth date, and other personal data on the Internet), credit card misappropriation trends (from financial institution systems), and the like. The system could also leverage/source existing external privacy services such as dark web search (using email addresses or the like), or other similar services to aggregate the appropriate external data in real time. The point of the invention is to collect both internal and external data elements to give users a view of their exposure via the vulnerability assessment. The system has valuable internal misappropriation data about users that can be layered for enhancing misappropriation assessments of the user. After providing users with a view of their potential vulnerably, the system gives tools and tips to help the users avoid future misappropriation or vulnerabilities. This would be seen by the users as a proactive awareness play to help protect themselves from misappropriation.

Embodiments of the invention are directed to systems, methods, and computer program products for real-time generation and deployment of specific user information security vulnerability levels based on vulnerability assessments for the user. The invention utilizes a two-component system to detect security vulnerabilities for a user, generate a coherent vulnerability level for the user in real-time, and provides user specific mitigation actions depending on each user vulnerability assessment. The first component of the system is an information threat assessment engine, which identifies and/or receives external and internal data regarding users to determine information security threats. The second component is an analytics engine, which is configured to generate vulnerability levels and specific mitigation actions for the user based on threat patterning. In some embodiments, the system may receive user authorization for vulnerability assessment. In this way, the system may identify an approval of a user for authorization and generation of the vulnerability assessments and levels for a user. The system may then identify internal vulnerability data associated with the user. The system may also request and extract external vulnerability data associated with the user such as dark web data, user's information potentially involved in third party information security breach, and/or other personal data on the internet.

In some embodiments, the system may combine internal and external vulnerability data and utilize an information threat assessment engine to review and compare user vulnerabilities to other users to identify a relative vulnerability assessment for the user. The system may then generate a user vulnerability level that gives the user a view of vulnerabilities for privacy misappropriation. Based on the external and internal data, the system may also generate mitigation actions such as tools and tips for user to reduce misappropriation based on the user specific internal and external data.

In some embodiments, the system may present the information security vulnerability level and mitigation actions to user via secure interface. The interface may also allow the user to authorize dissemination of score to third parties for user's applying to third party applications.

Figure 1:
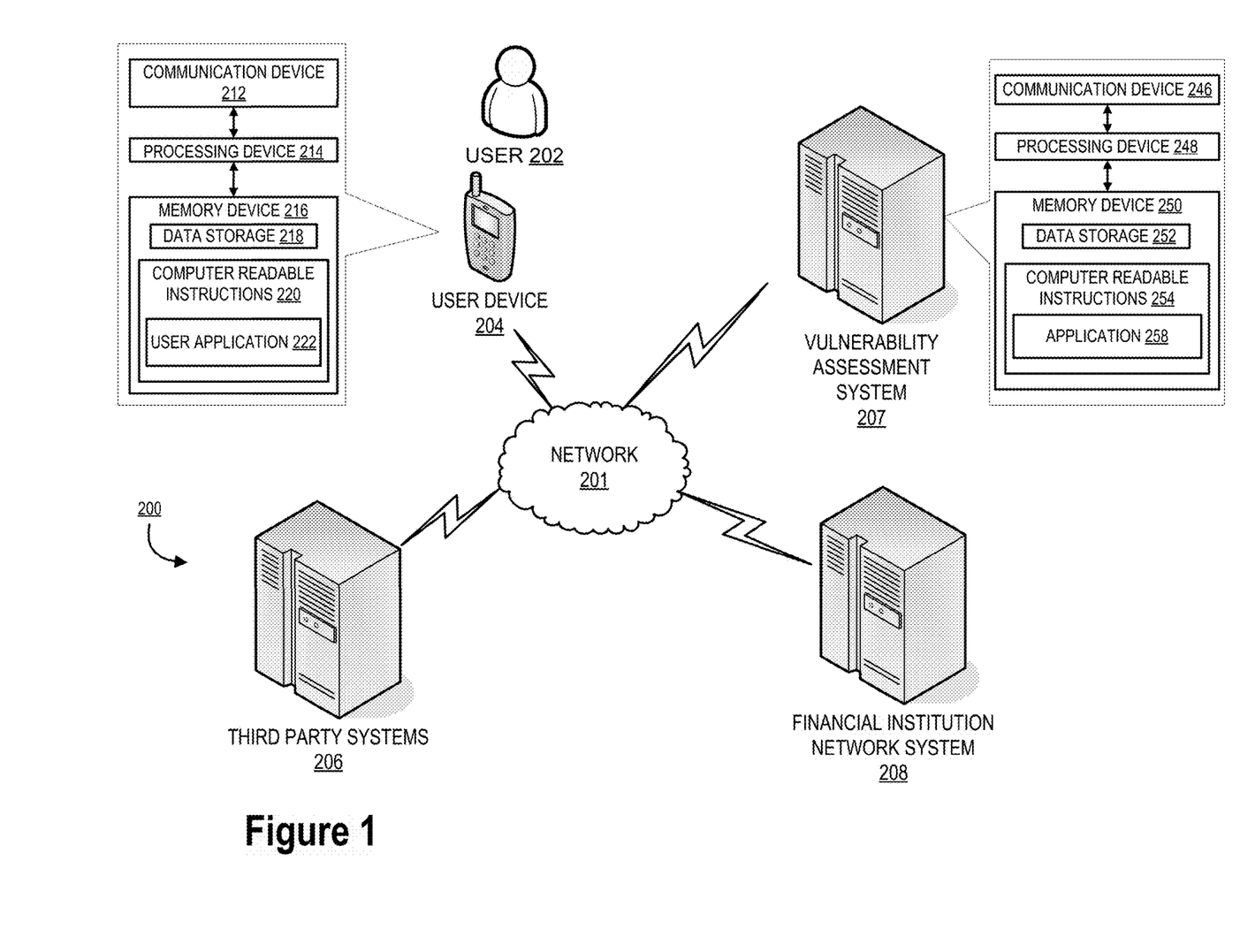
FIG. 1 illustrates an information security vulnerability assessment system environment, in accordance with embodiments of the present invention.

FIG. 1 illustrates an information security vulnerability assessment system environment 200, in accordance with embodiments of the present invention. FIG. 1 provides the system environment 200 for which the distributive network system with specialized data feeds for extract information for information security vulnerability assessments for the user. FIG. 1 provides a unique system that includes specialized servers and system communicably linked across a distributive network of nodes required to perform the functions vulnerability assessments for users As illustrated in FIG. 1, the financial institution network system 208 is operatively coupled, via a network 201 to the user device 204, vulnerability assessment system 207, and to the third party systems 206. In this way, the financial institution network system 208 can send information to and receive information from the user device 204, vulnerability assessment system 207, and the third party systems 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is one or more individuals with accounts at a financial institution or the like that the system may identify and generate vulnerability assessments for the user. The user may have one or more accounts associated with resources for distribution of resources. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the third party systems 206, the financial institution network system 208, and the vulnerability assessment system 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to set up marker codes and communicate with the third party systems 206.

As further illustrated in FIG. 1, the vulnerability assessment system 207 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the financial institution network system 208, the third party systems 206, and the user device 204. As such, the communication device 246 generally comprises a modem, server, or other device for communicating with other devices on the network 201.

As further illustrated in FIG. 1, the vulnerability assessment system 207 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the vulnerability assessment system 207 the memory device 250 stores an application 258. Furthermore, the vulnerability assessment system 207, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more financial institution network system 208, vulnerability assessment system 207, and/or user device 204.

The vulnerability assessment system 207 generates a two-component system to detect security vulnerabilities for a user 202 and the vulnerability assessment system 207 generates a vulnerability assessment for each individual user 202. Furthermore, the vulnerability assessment system 207 provides user specific mitigation actions depending on each user vulnerability assessment. The first component of the vulnerability assessment system 207 is an information threat assessment engine, which identifies and/or receives external and internal data regarding users and third parties associated with the users in order to determine information security threats posed to the users by third-parties (e.g., the third party itself, the processes is provides, the applications provided by the third-parties to the entity, or the systems provided by the third-parties to the entity). Based on the external and internal data, the vulnerability assessment system 207 may determine security threats, security threat information, and/or a security threat level based on the security threats and security threat information. In this way, the vulnerability assessment system 207 may calculate a vulnerability assessment for each individual user based on the internal and external data.

The second component of the vulnerability assessment system 207 is an analytics engine, which may comprise a machine learning component which is configured to detect threat patterns and anomalies in order to generate specific mitigation actions for the user. As such, the vulnerability assessment system 207 generates a user specific vulnerability assessment for each user 202 that will fluctuate based on information security threats posed to the user 202. The vulnerability assessment system 207 may be associated with a financial institution having vulnerability data available. This internal data is then tied with external data, such as dark web data, third party data, or the like. The vulnerability assessment system 207 may utilize the internal and external data and may determine a vulnerability assessment for the user 202, which gives the user 202 a view of their vulnerabilities to exposure. The vulnerability assessment system 207 may then generate user 202 specific mitigation actions for exposure or vulnerability mitigation that may include actions, education, or the like around the vulnerabilities. In this way, the vulnerability assessment system 207 may provide a novel service offering for users for vulnerability assessment and mitigation actions based on the same.

The vulnerability assessment system 207 leverages existing data to give users a vulnerability assessment or rating based on external dark web data (SSN, email, birth date, and other personal data on the Internet), credit card misappropriation trends (from financial institution systems), and the like. The vulnerability assessment system 207 could also leverage/source existing external privacy services such as dark web search (using email addresses or the like), or other similar services to aggregate the appropriate external data in real time. The point of the invention is to collect both internal and external data elements to give users a view of their exposure via the vulnerability assessment. The vulnerability assessment system 207 has valuable internal misappropriation data about users that can be layered for enhancing misappropriation assessments of the user 202. After providing users with a view of their potential vulnerably, the vulnerability assessment system 207 gives tools and tips to help the users avoid future misappropriation or vulnerabilities. This would be seen by the users as a proactive awareness play to help protect themselves from misappropriation.

As illustrated in FIG. 1, the financial institution network system 208 is connected to the vulnerability assessment system 207, user device 204, and third party systems 206. In other embodiments, the financial institution network system 208 may be a third party system separate from the vulnerability assessment system 207. The financial institution network system 208 has the same or similar components as described above with respect to the user device 204 and the third party systems 206. While only one financial institution network system 208 is illustrated in FIG. 1, it is understood that multiple financial institution network system 208 may make up the system environment 200.

It is understood that the servers, systems, and devices described herein illustrate one embodiment of the invention. It is further understood that one or more of the servers, systems, and devices can be combined in other embodiments and still function in the same or similar way as the embodiments described herein. The financial institution network system 208 may generally include a processing device communicably coupled to devices as a memory device, output devices, input devices, a network interface, a power source, one or more chips, and the like. The financial institution network system 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like. The memory device may store any of a number of applications or programs which comprise computer-executable instructions/code executed by the processing device to implement the functions of the financial institution network system 208 described herein.

Figure 2:
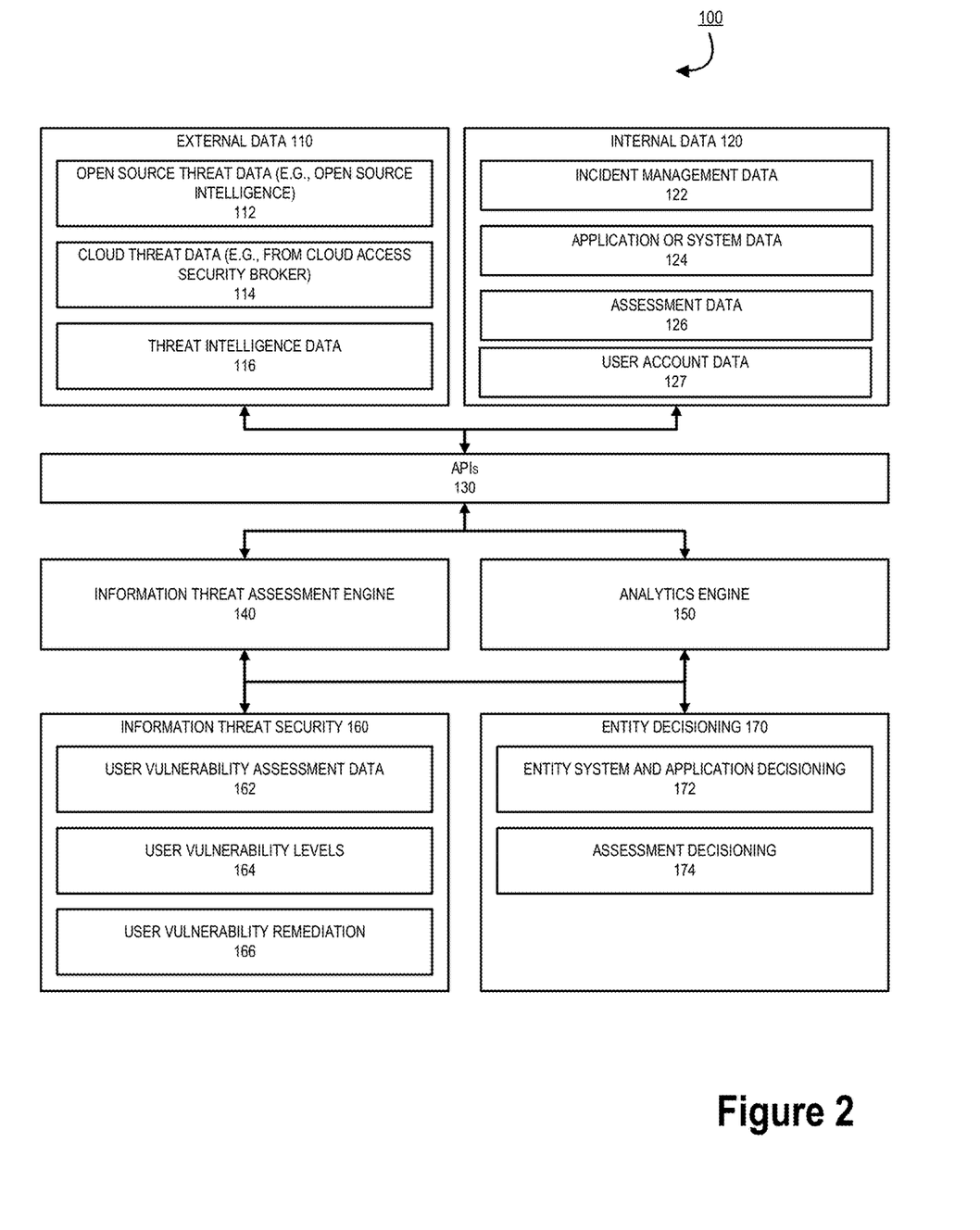
FIG. 2 illustrates a flow chart for vulnerability assessment system processing, in accordance with embodiments of the present invention.

FIG. 2 illustrates a flow chart for vulnerability assessment system processing 100, in accordance with embodiments of the present invention. As illustrated, in FIG. 2 the vulnerability assessment system may be developed based on external data 110 it receives from an external sources and/or internal data 120 it captures from within the entity system, in order to identify potential vulnerabilities and security threats for a user. As illustrated by block 130 in FIG. 2, the external data 110 and the internal data 120 may be received through one or more APIs 130, which allows the external data source systems and/or entity systems, and the applications and systems associated therewith, to interact with the vulnerability assessment system through different systems and/or applications.

The external data 110 may include different types of external threat data regarding third-parties or users, such as open source threat data 112, cloud threat data 114, and threat intelligence data 116, or the like. The open source threat data 112 (e.g., open source intelligence ("OSINT") data) may include various data that is monitored by an external data source. For example, the open source a data may be a summary threat level of third-parties based on the information that the external data source has on the third-parties. The open source data 112 may further be based on a category type of the third-parties (e.g., type of business in which the third-party is involved), such as the products that the third-parties offers and the information to which the third-parties have access. The open source data 112 may further include remediation data, such as the how are potential threats dealt with by the third-party. It should be understood, when third-party is used herein, unless otherwise specified, third-party may include the actual third party, the products offered by the third-party, the systems utilized by the third party, and/or and applications used by the third party.

The cloud threat data 114 (e.g., a cloud access security broker ("CASB") data) may be similar to the type of data associated with the open source threat data 112, but it may be specific to data related to the cloud services that the third parties may be utilize. As such, the cloud threat data 114 may include summary threat level of third-parties or users for the cloud related activities, a category type associated with the cloud related activities, and/or remediation data associated with the cloud related activities. The open source threat data 112 and cloud threat data 114 may be identified and utilized separately because different entities may be providing the associated products and each may have different security threats associated therewith.

The external data 110 may also include threat intelligence data 116, which may relate to publicly available information, such as news, trade information, or other publicly accessed information that may indicate potential security threats associated with particular third-parties.

It should be understood that the external data 110 received from the external data sources may be information to which the one or more entities currently do not have access. For example, the external data source systems 40 may monitor communications over the Internet with the third-parties, and thus, the external data source systems 40 may monitor the number of communications with the third-parties, the type of communications, the requests within the communications (e.g., required authentication, number of authentication factors, such as one, two, three, or the like). Additionally, the external data sources may have access to other information regarding incidents, assessments, or the like that the entity does not have, and thus, may provide a different view of the security threats associated with the third-parties or users. Moreover, different external data sources may have different information about third-parties, and thus, it may be beneficial to access external data 110 from different external sources.

The internal data 120 may include incident management data 112, which is related to any incidents that may be associated with a third-party system, user system, and/or application that is utilized by the entity. For example, the incident may be a security breach, misappropriated data, exposure of confidential information, attempted or successful unauthorized access by another party (e.g., not the third-party and not the entity), or other like incident that resulted in or could have resulted in a security threat to the user. The internal data 120 may further include application and/or system data 124, which is related to the operation and/or use of the application and/or system. For example, the application and/or system data 124 may include how the application and/or system is utilized within the entity, such as what information does is store (e.g., anonymous data, personal data), how the application and/or system operates (e.g., how the information is stored, how a user accesses the information), what other applications and/or systems communicate with the third-party applications and/or systems (e.g., how many different ways is the information accessed and/or distributed). The internal data 120 may further include assessment data 126, which relates to different types of assessments that were performed on the third-party (e.g., the third-party itself, the third party application, and/or the third party system). Different types of assessments may include self-assessments provided by the third-party to the entity, online assessments provided by the entity to the third-party, and/or onsite assessments for which a user associated with the entity travels to the third-party to review the third party processes, its applications, and/or its systems. The assessment data 126 may further include a frequency of assessments indicating how often a third party should be assessed and what type of assessment should be used to make the assessments (e.g., onsite assessment once a year and online assessments three times a year, or the like).

In some embodiments, internal data 120 may further include user account data 127. User account data 127 may include user credit cards, number of new credit cards, misappropriations, accounts, resources, or the like associated with the user at the entity financial institution.

As illustrated in FIG. 2, the information threat assessment engine 140 and/or the analytics engine 150 may be utilized for the entity's information security threat platform 160 and/or the entity decisioning platform 170. For example the information threat assessment engine 140 and/or analytics engine 150 may be utilized to provide user vulnerability assessment data 162, user information security vulnerability levels 164, and/or user vulnerability remediation 166. Moreover, as previously discussed herein, the information threat assessment engine 140 and/or analytics engine 150 may be utilized to provide user vulnerability decisioning 172 and/or to provide assessment decisioning 174.

It should be understood that the assessments and/or the determination of the security threats may result in the implementation of security controls. As such, the results of the assessments may provide information on whether or not various security controls require implementing. As such, the assessment may relate to and/or result in security controls for implementing a user vulnerability mitigation action or plan (e.g., actions to take in response to a security threat) or the like. Furthermore the assessment may result in security controls such as technical recovery plans (e.g., technical actions to take in response to a security threat); mitigating potential security threats associated with the user; recovery time requirements in place for various levels of incidents (e.g., essential incidents corrected in 8 hours, non-essential incidents corrected in one week); perform user impact analysis of potential security threats (e.g., how incidents will affect the business); back up plans are tested regularly (e.g., regular verification of back-up systems and/or applications);

formal change management procedures are outlined for any application or system changes (e.g., logging of application and/or system changes); remote access is properly encrypted; relevant internal and external communications use an approved proxy service; monitoring of the electronic communications for confidential information of the user; monitoring and controlling write privileges to external drives; the devices within the business include anti-virus technology; access to data requires multifactor authentication; password requirements are instituted; encryption access is split to require multiple people in order to access such information; monitoring of security log information occurs; and/or the like.

Figure 5:
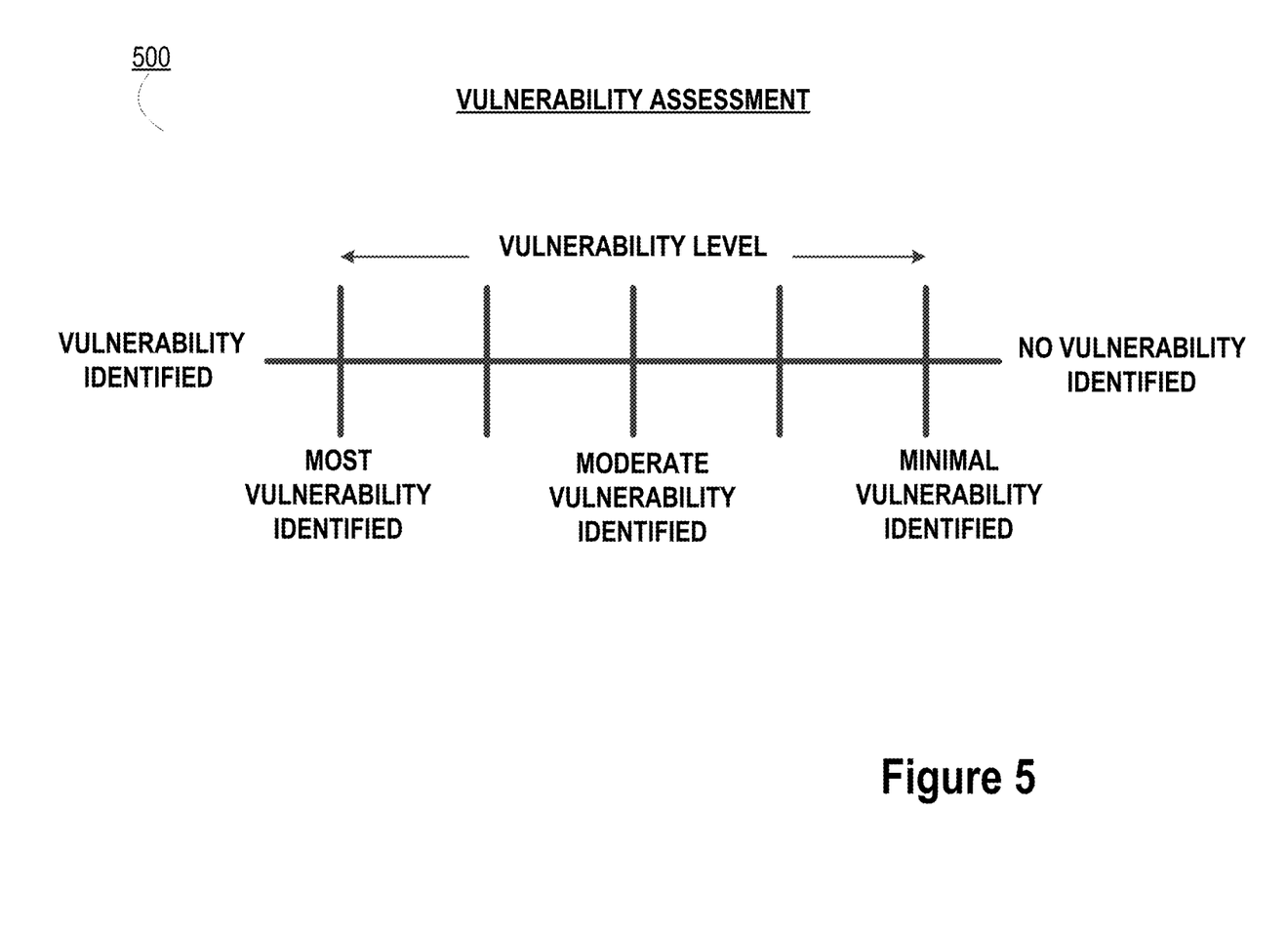
FIG. 5 illustrates an information security vulnerability assessment continuum for vulnerability level identification and processing, in accordance with embodiments of the present invention.

It should be further understood that in some embodiments of the invention the security threat level described herein may include a ranking of the vulnerabilities that are potential to the user based on potential security threats. In embodiments of the invention, the ranking may include a general ranking (e.g., high, medium, low, or the like), a specific score, continuum (such as illustrated in FIG. 5), or the like. In some embodiments a score may be based on the external data 110 and the internal data 120. In some embodiments the score may be a measurement of the likelihood of having a security threat event. In some embodiments, the score may be based on scoring of the weighted factors of the external data 110 and the internal data 120.

It should be understood that the present invention improves traditional security threat systems by not only utilizing internal data regarding applications and/or resource misappropriation of a user, but also by accessing external data from outside data sources in order to supplement the internal data that is available to the entity. The combination of the internal and external data is utilized to more accurately identify potential security threats of a user and present those threats to the user and mitigation actions for reducing potential future or current vulnerabilities to the user in the form of security threats. The present invention also is able to predict how likely the security threats identified will result in an incident in the future (e.g., within the weeks, months, years, or the like). Moreover, the determination of the security threats helps the user to determine plans for mitigating and/or eliminating the security threats by implementing security controls. Furthermore, continuous monitoring of the security threats (e.g., based on continuous monitoring of the external and/or internal data) allows the user to make decisions regarding how to mitigate potential incidents and/or whether or not to take specific actions with respect to potential vulnerabilities and transacting with third parties. In other embodiments, the present invention may automatically implement security controls for the application and/or system for the user upon user approval and authorization. As such, the present invention allows for real-time management of security threats and implementation of security controls in order to prevent potential incidents (e.g., misappropriation of personal information, loss of confidential information, or the like). The present invention is an improvement over traditional systems because of the use of the external data, and the real-time monitoring of the security threats, which results in more accurate determination of security threats and more efficient mitigation of such security threats on an individual by individual bases.

It should be further understood that changes in the external data and internal data, as well as the resulting changes in the security threats, may be monitored over time in order to improve upon the accuracy of the determination of the security threats. For example, the monitoring may allow for the determination of patterns in the accuracy of identifying security threats that results in the reduction of the occurrence of incidents. Moreover, the monitoring may help to determine patterns in the correlation between the individual assessment inquires related to the security threats with the actual incidents in order to determine if the right assessment inquiries are being made and the right security controls are being implemented.

In some embodiments of the invention one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems, devices, or components thereof described herein.

It should be understood, that the systems, devices, and components described in FIGS. 1 and 2, or other devices not specifically described herein, may be configured to establish an electronic communications link with each other in order to accomplish the steps of the processes described herein. The link may be an internal link within the same systems or an external link with the other systems of other parties. The information provided by the systems may be made continuously available, however, continuously available does not necessarily mean that the sources actually continuously generate data, but that a sources are continuously available to generate and send data real-time (e.g., instantaneously and/or within a few seconds, or the like) of receiving a request for it. In any case, the sources may be continuously available to receive and/or generate information, in some cases in digitized data in Internet Protocol (IP) packet format.

Moreover, it should be understood that the process flows described herein include transforming the information sent and/or received from the applications of the different systems (e.g., internally or externally) from one or more data formats into a data format associated with each individual system. There are many ways in which information is converted within the system environment 1. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

Figure 3:
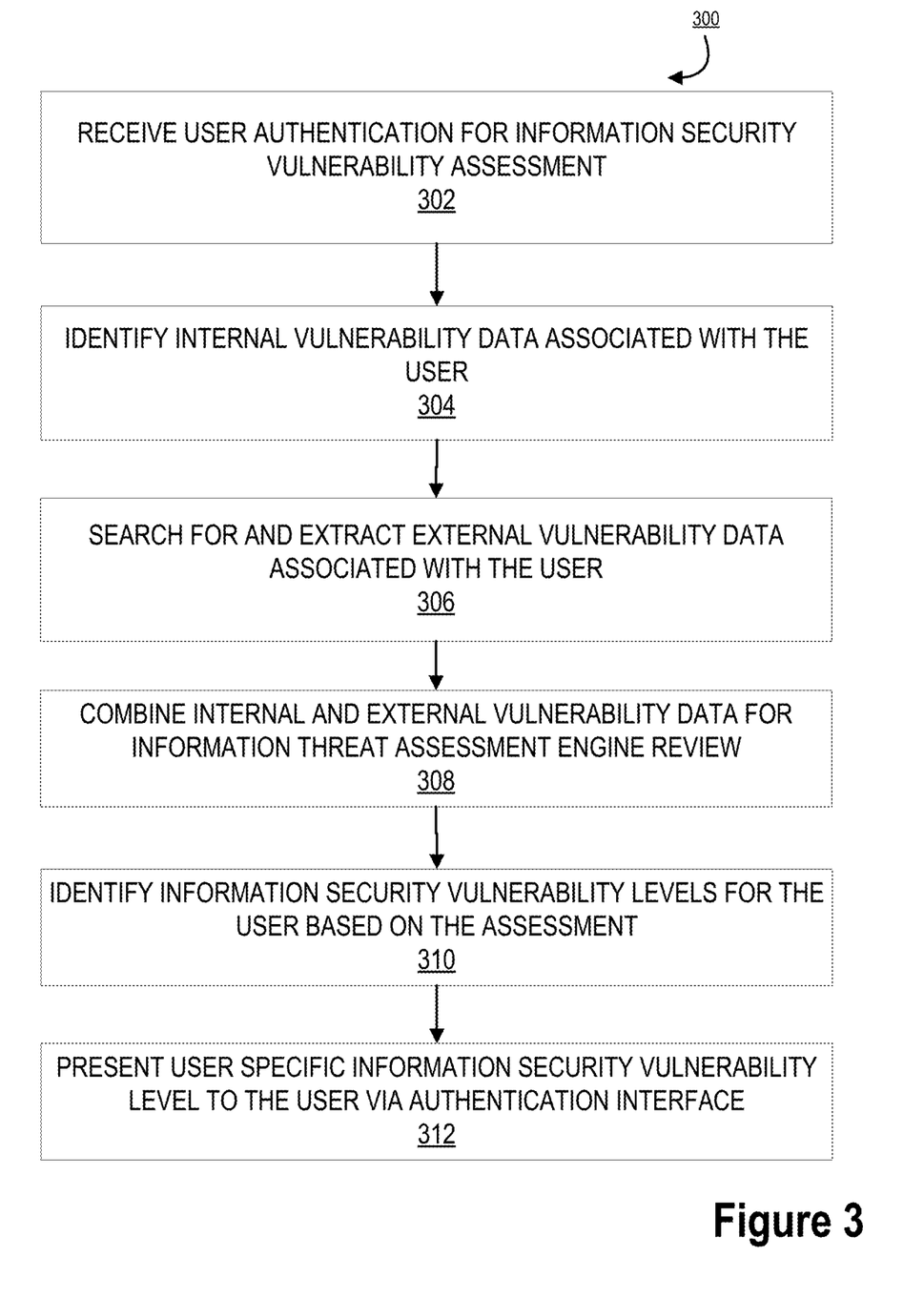
FIG. 3 illustrates a high level flowchart for information security vulnerability assessment generation, in accordance with embodiments of the present invention.

FIG. 3 illustrates a high level flowchart for information security vulnerability assessment generation 300, in accordance with embodiments of the present invention. As illustrated in block 302, the process 300 is initiated by receiving user authentication for information security vulnerability assessment. In this way, the user may sign into the system interface and request or authorize the system to generate a vulnerability assessment for the user including a vulnerability level. The user may sign into and authorize the assessment via one or more online financial institution account management centers, third party systems, or the like.

Upon authorization, the system may identify internal vulnerability data associated with that specific user, as illustrated in block 304. The internal vulnerability data or internal data as used at some portions herein, may include incident management data, which is related to any incidents that may be associated with a third-party system, user system, and/or application that is utilized by the entity. The internal data may further include application and/or system data, which is related to the operation and/or use of the application and/or system. The internal data may further include assessment data, which relates to different types of assessments that were performed on the third-party (e.g., the third-party itself, the third party application, and/or the third party system). Furthermore, internal data may further include user account data. User account data may include user credit cards, number of new credit cards, accounts, resources, or the like associated with the user at the entity financial institution.

Next, as illustrated in block 306, the process 300 continues by searching for and extracting external vulnerability data associated with the user. The external vulnerability data may include dark web data, third party data, or the like. Furthermore, the external data may include different types of external threat data regarding third-parties or users, such as open source threat data, cloud threat data, dark web data, threat intelligence data, or the like. The open source threat data may include various data that is monitored by an external data source. The open source data may further include remediation data, such as the how are potential threats dealt with by the third-party. The cloud threat data may be similar to the type of data associated with the open source threat data, but it may be specific to data related to the cloud services that the third parties or users may be utilize. The external data may also include threat intelligence data, which may relate to publicly available information, such as news, trade information, or other publicly accessed information that may indicate potential security threats associated with particular third-parties or users.

As illustrated in block 308, the process 300 continues by combining internal and external vulnerability data for information threat assessment engine review. In this way, the system compares the vulnerabilities via the information threat assessment engine that identifies and/or receives external and internal data regarding users and third parties associated with the users in order to determine information security threats posed to the users by third-parties. As illustrated in block 310, the process 300 continues by identifying information security vulnerability levels for the user based on the assessment. The information security vulnerability levels may include a score along a continuum from high vulnerability to low vulnerability based on the exposure identified from the internal and external data.

Finally, as illustrated in block 312, the process 300 is completed by presenting the user specific information security vulnerability level to the user via an interface that was authenticated into by the user.

Figure 4:
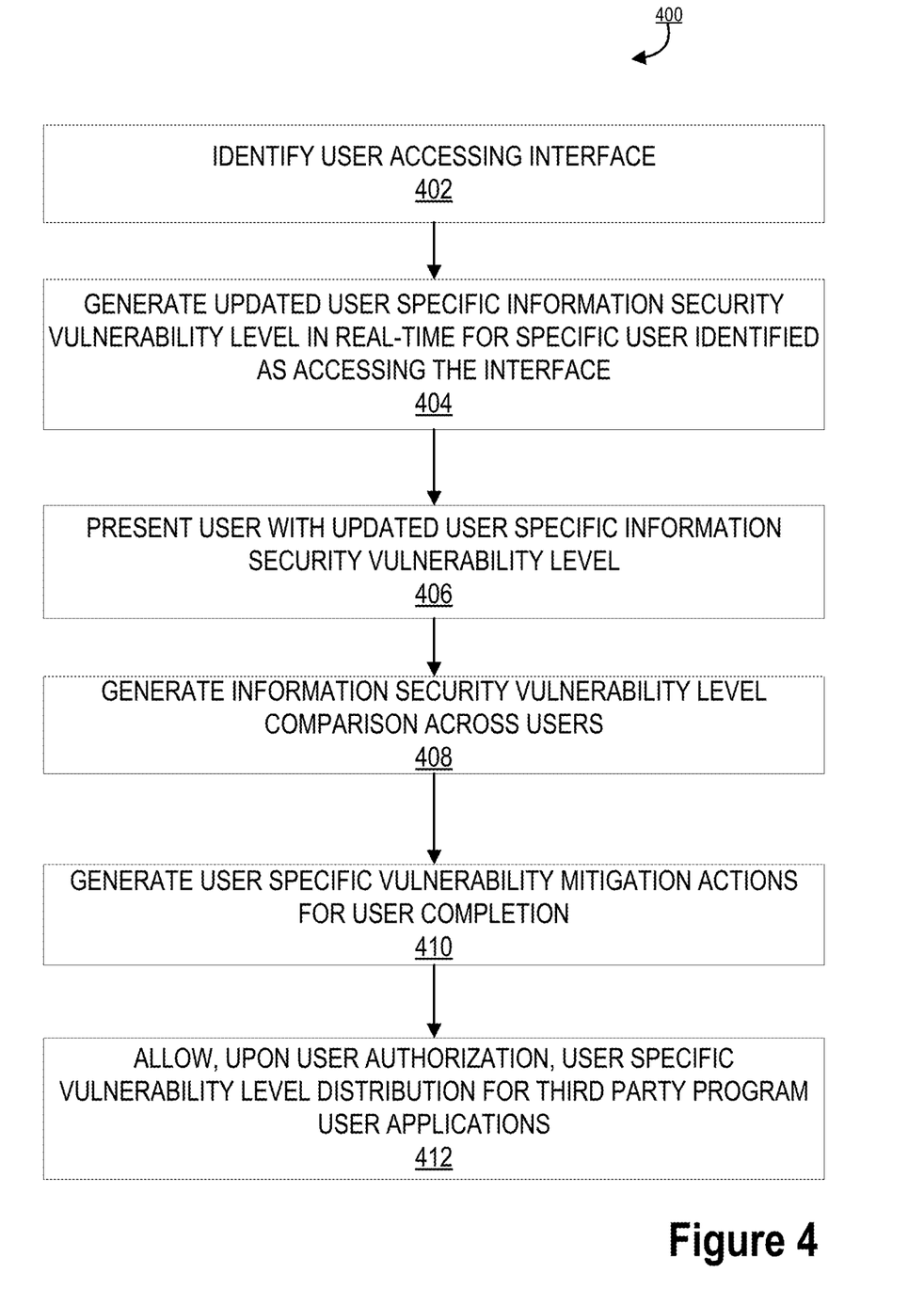
FIG. 4 illustrates a flowchart for information security vulnerability assessment presentation, in accordance with embodiments of the present invention.

FIG. 4 illustrates a flowchart for information security vulnerability assessment presentation 400, in accordance with embodiments of the present invention. As illustrated in block 402, the process 400 is initiated by identifying a user accessing an interface. In this way, the interface may be associated with a user account, financial institution, or the like. The interface may be password protected and/or require user authentication to gain access to the data associated with the interface.

As illustrated in block 404, the system may generate an updated user specific information security vulnerability level in real-time for the specific user identified as accessing the interface. In this way, the system may extract external and internal data upon user authentication into the interface to update the vulnerability level for the user. The vulnerability level may comprise a vulnerability assessment for the user in the form of a score. The score may be a sliding continuum scale based on the vulnerabilities identified via the data.

Next, as illustrated in block 406, the process 400 continues by presenting the user with the updated user specific information security vulnerability level. The vulnerability level may be presented to the user via an interface requiring user authentication to gain access to. This may be an online or mobile banking application, financial institution account application, or the like. The user specific information security vulnerability level may indicate a level of potential privacy vulnerability for the user. The vulnerability level gives the user a proactive awareness to aid in protection from misappropriation or other vulnerabilities to the user's personal and financial information. In some embodiments, as illustrate in block 408, the system may further generate an information security vulnerability level comparison across users. In this way, the system may compare the user vulnerability level to users that are in like geographical locations, have similar resource distribution trends, and the like. The comparisons are anonymous, but allows a user to visualize the vulnerability level in comparison to other users that are similarly situated.

Upon generation of the user specific vulnerability level for the user, the system may also identify one or more external or internal data points that drive the level. The system may, as illustrated in block 410, generate a user specific vulnerability mitigation actions for the user in order to limit the user's vulnerability. These mitigation actions may be limiting the user of one or more credit cards, limiting purchases at one or more locations or merchants, limiting dissemination of user data to one or more third party sources, or the like.

Finally, as illustrated in block 412, the system may distribute user specific vulnerability levels to third parties for user applications to the third party programs upon user authorization of distribution. In this way, the system, upon user approval, may distribute the vulnerability level of the user to a third party. The vulnerability level may be utilized to evaluate the user potential worthiness of the product or service provided by the third party. This may be used for approval of the user for a loan, access to third party privileges, or the like.

FIG. 5 illustrates an information security vulnerability assessment continuum for vulnerability level identification and processing 500, in accordance with embodiments of the present invention. On the left-hand side of the continuum, a "vulnerability identified" identifies that several vulnerabilities from external and internal data have been identified. On the continuum, this point is were the most vulnerabilities are identified from internal or external data, such as new credit cards issued, misappropriations, dark web information available, or the like. On the right-hand side of the continuum, a "no vulnerability identified" indicates when no vulnerabilities to the user have been identified during search of the internal and external data. In between the two extremes, most vulnerabilities identified equates to a low vulnerability level with several mitigation actions for a user to complete, moderate vulnerabilities identified equates to a moderate vulnerability level with moderate mitigation actions for a user to complete, and minimal vulnerabilities identified equates to a high vulnerability level with few or no mitigation actions for a user to complete.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authentication and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. Patent Application Ser. No. | Title | Filed On |
| --- | --- | --- |
| 15/827,094 published as U.S. Patent Publication | SYSTEM FOR INFORMATION SECURITY THREAT ASSESSMENT | Concurrently herewith |

-continued

| U.S. Patent Application Ser. No. | Title | Filed On |
|---|---|---|
| No. 2019/0166154 15/827,292 published as U.S. Patent Publication No. 2019/0166155 | BASED ON DATA HISTORY SYSTEM FOR GENERATING A COMMUNICATION PATHWAY FOR THIRD PARTY VULNERABILITY MANAGEMENT | Concurrently herewith |
| 15/826,893 published as U.S. Patent Publication No. 2019/0166152 | SYSTEM FOR INFORMATION SECURITY THREAT ASSESSMENT | Concurrently herewith |
| 15/827,515 published as U.S. Patent Publication No. 2019/0163916 | DATA INTEGRATION SYSTEM FOR TRIGGERING ANALYSIS OF CONNECTION OSCILLATIONS | Concurrently herewith |
| 15/827,034 published as U.S. Patent Publication No. 2019/0163914 | SYSTEM FOR INFORMATION SECURITY THREAT ASSESSMENT AND EVENT TRIGGERING | Concurrently herewith |
| 15/827,097 published as U.S. Patent Publication No. 2019/0163915 | SYSTEM FOR RECURRING INFORMATION SECURITY THREAT ASSESSMENT | Concurrently herewith |

What is claimed is:

1. A system for user specific information security vulnerability level generation, the system comprising:
a memory device with computer-readable program code stored thereon;
a communication device;
a printing device for printing resource distribution documents;
a processing device operatively coupled to the memory device and the communication device, wherein the processing device is configured to execute the computer-readable program code to:
receive authentication from a user for a user specific vulnerability assessment;
identify external data for the user, wherein the external data comprises security threat data for the user from an external data source, and wherein the external data is received from an external data source system;
identify internal data for the user, wherein the internal data comprises security threat data for the user from an internal data source;
determine the user specific vulnerability assessment comprising information security threats for the user based on the external data and the internal data;
calculate a vulnerability level for the user based on the information security threats;
present, via a secured interface, a real-time vulnerability level for the user upon user authentication into the secured interface and include user specific mitigation actions for the user to reduce vulnerability level; and
distribute the real-time vulnerability level for the user to a third party for user application and authorization into a third party program.

2. The system of claim 1, further comprising determining the mitigation actions based on the one or more security threats, wherein the mitigation actions comprises steps for user action to positively adjust the vulnerability level for the user comprising security controls for implementation by user to mitigate the one or more security threats.

3. The system of claim 1, wherein calculating the vulnerability level for the user further comprises generating a level from a vulnerability continuum based on the number of vulnerabilities identified from the user specific vulnerability assessment.

4. The system of claim 1, wherein the internal data comprises:
internal product data, wherein the product data is associated with products of the user; and
incident data related to the user, wherein the incident data comprises resource account management incidents associated with the user.

5. The system of claim 1, wherein the information security threats for the user comprises one or more vulnerabilities for the user based on the external data and the internal data, wherein the vulnerabilities include at least unauthorized private information dissemination.

6. The system of claim 1, wherein identifying external data for the user, wherein the external data comprises security threat data for the user from an external data source, wherein the external data source is Internet traffic.

7. A computer program product for user specific information security vulnerability level generation with at least one non-transitory computer-readable medium having computer-readable program code portions embodied therein, the computer-readable program code portions comprising:
an executable portion configured for receiving authentication from a user for a user specific vulnerability assessment;
an executable portion configured for identifying external data for the user, wherein the external data comprises security threat data for the user from an external data source, and wherein the external data is received from an external data source system;
an executable portion configured for identifying internal data for the user, wherein the internal data comprises security threat data for the user from an internal data source;
an executable portion configured for determining the user specific vulnerability assessment comprising information security threats for the user based on the external data and the internal data;
an executable portion configured for calculating a vulnerability level for the user based on the information security threats;
an executable portion configured for presenting, via a secured interface, a real-time vulnerability level for the user upon user authentication into the secured interface and include user specific mitigation actions for the user to reduce vulnerability level; and
an executable portion configured for distributing the real-time vulnerability level for the user to a third party for user application and authorization into a third party program.

8. The computer program product of claim 7, further comprising an executable portion configured for determining the mitigation actions based on the one or more security threats, wherein the mitigation actions comprises steps for user action to positively adjust the vulnerability level for the user comprising security controls for implementation by user to mitigate the one or more security threats.

9. The computer program product of claim 7, wherein calculating the vulnerability level for the user further comprises generating a level from a vulnerability continuum based on the number of vulnerabilities identified from the user specific vulnerability assessment.

10. The computer program product of claim 7, wherein the internal data comprises:

internal product data, wherein the product data is associated with products of the user; and incident data related to the user, wherein the incident data comprises resource account management incidents associated with the user.

11. The computer program product of claim 7, wherein the information security threats for the user comprises one or more vulnerabilities for the user based on the external data and the internal data, wherein the vulnerabilities include at least unauthorized private information dissemination.

12. The computer program product of claim 7, wherein identifying external data for the user, wherein the external data comprises security threat data for the user from an external data source, wherein the external data source is Internet traffic.

13. A computer-implemented method for user specific information security vulnerability level generation, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

receiving authentication from a user for a user specific vulnerability assessment;

identifying external data for the user, wherein the external data comprises security threat data for the user from an external data source, and wherein the external data is received from an external data source system;

identifying internal data for the user, wherein the internal data comprises security threat data for the user from an internal data source;

determining the user specific vulnerability assessment comprising information security threats for the user based on the external data and the internal data;

calculating a vulnerability level for the user based on the information security threats;

presenting, via a secured interface, a real-time vulnerability level for the user upon user authentication into the secured interface and include user specific mitigation actions for the user to reduce vulnerability level; and distributing the real-time vulnerability level for the user to a third party for user application and authorization into a third party program.

14. The computer-implemented method of claim 13, further comprising determining the mitigation actions based on the one or more security threats, wherein the mitigation actions comprises steps for user action to positively adjust the vulnerability level for the user comprising security controls for implementation by user to mitigate the one or more security threats.

15. The computer-implemented method of claim 13, wherein the internal data comprises:

internal product data, wherein the product data is associated with products of the user; and incident data related to the user, wherein the incident data comprises resource account management incidents associated with the user.

16. The computer-implemented method of claim 13, wherein the information security threats for the user comprises one or more vulnerabilities for the user based on the external data and the internal data, wherein the vulnerabilities include at least unauthorized private information dissemination.

17. The computer-implemented method of claim 13, wherein identifying external data for the user, wherein the external data comprises security threat data for the user from an external data source, wherein the external data source is Internet traffic.

* * * * *